United States Patent [19]

Hinsperger

[11] Patent Number: 5,070,643
[45] Date of Patent: Dec. 10, 1991

[54] METHOD AND COVER FOR GRASS PROTECTION AND RESTORATION AND FOR SEED GERMINATION

[76] Inventor: Cornelius Hinsperger, 3262 Shelburne Pl., Oakville, Ontario, Canada, L6L 5V9

[21] Appl. No.: 617,507

[22] Filed: Jul. 6, 1988

Related U.S. Application Data

[63] Continuation-in-part of Ser. No. 873,440, Jun. 5, 1986, abandoned.

[30] Foreign Application Priority Data

May 5, 1986 [CA] Canada ................... 508349

[51] Int. Cl.⁵ ............................................. A01G 13/00
[52] U.S. Cl. ............................................. 47/31; 47/9; 47/58; 428/919
[58] Field of Search ............ 47/9 S, 9 R, 31, 58, 47/28; 428/46, 284, 289, 919, 256

[56] References Cited

U.S. PATENT DOCUMENTS

| | | | |
|---|---|---|---|
| 1,810,463 | 6/1931 | Cook | 471/9 |
| 2,401,997 | 6/1946 | Whitman | 47/31 |
| 3,252,251 | 5/1966 | Simmons | 47/29 |
| 3,482,609 | 12/1969 | Neckerman | 47/9 |
| 3,704,544 | 12/1972 | Spanel | 47/9 |
| 3,769,747 | 11/1973 | Chapman | 47/31 |
| 3,848,359 | 11/1974 | Seith | 47/9 |
| 3,975,859 | 8/1976 | Muller | 47/9 |
| 4,291,082 | 9/1981 | Stall | 428/919 |
| 4,589,224 | 5/1986 | Collette | 47/31 |

FOREIGN PATENT DOCUMENTS

| | | | |
|---|---|---|---|
| 159165 | 10/1985 | European Pat. Off. | 47/28 |
| 2639835 | 5/1977 | Fed. Rep. of Germany | 47/31 |
| 1437333 | 3/1961 | France | 47/29 |
| 220490 | 4/1985 | German Democratic Rep. | 47/31 |
| 1216622 | 9/1986 | Japan | 47/31 |

Primary Examiner—Henry E. Raduazo
Attorney, Agent, or Firm—Browdy and Neimark

[57] ABSTRACT

A method of protecting outdoor grass areas from dessication and winter kill; for enhancing seed germination both grass seed and flower and vegetable seeds; and for increasing soil temperature and stimulating early root and top growth. The method comprises encasing the area concerned with a cover comprising at least one panel of open weave scrim material formed by loosely woven thin and narrow UV stabilized strips of clear transparent plastic material having a non-uniform striped lace coating of highly UV stabilized plastic covering less than 50% of the surface area of the scrim permitting passage of air and moisture through the open weave of the scrim. For large areas a plurality of panels can be joined together as by sewing. The cover can be secured in position by wire stakes, and by ropes passing over the cover.

35 Claims, 2 Drawing Sheets

METHOD AND COVER FOR GRASS PROTECTION AND RESTORATION AND FOR SEED GERMINATION

This application is a continuation-in-part application of application Ser. No. 873,440, filed June 5th, 1986, in the name of the present applicant and now abandoned.

The present invention relates to a method and a cover for protecting outdoor areas of grass for enhancing growth of grass and for enhancing seed germination.

It is well known that cold winter months have a very damaging effect on unprotected grass roots with the roots being killed by freezing and desicoation, and in the case particularly of greens and tees on golf courses, the repair and restoration of greens and tees in the spring to acceptable playing condition requires considerable effort and expense and delays the opening of the golfing season.

Wear and tear also occurs during the playing season for various activities. Golf greens, and tees, can be worn and damaged by constant use, and football fields are also worn at various places.

One object of the present invention is to protect grass and grass roots from desiccation and kill during the winter months and to enhance the growth of grass in the spring.

A further object is to enhance the germination of grass seed sown on repair areas of recreational grass sites, and also enhance the growth of the grass.

A further use of the invention is to enhance the germination of seeds, such as flower and vegetable seeds, in flats and other containers, or in the ground.

These objects are accomplished by covering the area concerned with an insulating cover which permits the passage of air and moisture and sunlight while guarding against desiccation and which is easy and simple in positioning and removal and which is strong and lightweight and economical and which will provide many years of useful service. The fabric used in the manufacture of the cover consists of an open weave scrim formed by loosely woven thin and narrow strips of clear transparent strips of plastic material which are highly stabilized against deterioration by ultraviolet (UV) light which is coated with a non-uniform striped lace coating of highly stabilized UV plastic covering less than 50% of the surface area of the scrim with the remaining surface area of the scrim permitting passage of air and moisture through the open weave of the scrim.

The cover is strong and lightweight and as the plastics used are highly stabilized against degradation by ultra violet light, the cover will provide many years of satisfactory service at a very economical cost.

The present invention is well suited for the preservation of golf greens and tees during cold and snowy winter months. It is also well suited for lawn bowling greens, nurseries and sod farms, parks and other areas where grass protection and early growth is advantageous. Further, the invention is well suited to the restoration of worn or damaged areas of grass, areas killed by some means such as salt, and also for the enhancement of seed germination.

DISCUSSION OF PRIOR ART

Applicant is aware of other attempts to protect out door grass from desiccation and winter kill by covering the area to be protected with individual sections of non-woven spun material but as it is not practicable to secure the sections together by means such as stitching due to the nature of the material the sections must be individually laid and positioned requiring considerable time and effort. Moreover, and again due to the nature of non-woven materials the sections soon become worn and tattered through handling, resulting in short useful life. Also, when many large surface areas are to be covered such as the 18 or more greens of a golf course the storage of a great number of sections during the summer months presents difficulties.

THE PRESENT INVENTION

The present invention avoids the disadvantages inherent in other known covers by the use of a material which not only provides protection against desiccation while permitting the passage of air and moisture but which is of a strength which enables individual panels to be secured together by stitched seams, if so desired to provide one-piece covers of any desired shape and size covers of single or multiple panels, are lightweight and easy to position and remove and can be compactly folded and packaged for ease of transportation and storage.

The covers of the invention may conveniently be manufactured to cover specific areas of grass which are to be protected such as golf course greens and by identifying the individual covers with the numbers of the greens for which they are intended, the labour and time involved in positioning the covers in the fall is considerably simplified.

The cover of the present invention, although porous, prevents desiccation and has insulating qualities and maintains the underlying surface at temperatures several degrees higher than ambient temperature, while permitting passage of air and moisture therethrough and permitting the passage of light resulting in a stimulation of early root and top growth.

Tests of the present cover and its use were conducted on golf course greens in the State of Michigan, U.S.A., and in Mississauga, Ontario, Canada, during the winter months of 1985–1986, and the results are most encouraging. Use of the cover during the tests eliminated damage to the turf from desiccation, and the increase in soil temperature by several degrees stimulated early root and top growth. The turf maintained a good green colour throughout the winter months and the use of the cover significantly improved the appearance, early playability and general health of the turf. These tests also established the ease with which these large covers can be positioned and removed.

The covers of the present invention comprise at least one panel of open weave scrim material formed by thin and narrow ultraviolet (UV) light stabilized strips of clear plastic material having on one surface a non-uniform striped lace coating of highly UV stabilized plastic which covers less than half of the surface area of the scrim leaving the remaining surface area of open weave scrim for the passage of air and moisture therethrough. The non-uniform lace coating is applied to the open weave scrim by depositing hot melted UV stabilized plastic material which is compatible with the plastic material forming the scrim over the surface of the scrim in irregular streams, with the coating then hardening and bonding with the material of the scrim to secure the strips of the scrim together along the points of contact while leaving the remaining surface area of the scrim in loose weave fashion which provides the necessary porosity.

In the tests of the present cover discussed above the striped lace coating covered approximately 30% of the surface area of the scrim providing a porosity of approximately 30 to 40% and the passage of up to 85% of natural light.

In preferred construction, the scrim is formed of strips of highly UV stabilized polyethylene, and the coating which is applied to the scrim is compatible polyethylene which has been treated to be even more highly resistant to degradation by ultraviolet light. The highly UV stabilized coating has a translucent white colour whereas the polyethylene forming the scrim is clear and transparent permitting the passage of light. Alternatively, the strips can be of polypropylene and the coating of compatible polypropylene.

Specifically then, one object of the present invention is to provide a method for protecting an area of outdoor grass from desiccation and kill during winter months and for increasing turf temperature and stimulating early root and top growth, comprising covering the area of grass in the fall with a lightweight insulating one-piece cover comprising at least one panel of open weave scrim material formed by loosely woven thin and narrow UV stabilized strips of clear transparent plastic material having a non-uniform striped lace coating of highly UV stabilized plastic covering less than 50% of the surface area of the scrim with the remaining surface area of the scrim permitting passage of air and moisture through the open weave of the scrim, and securing the cover in position over the grass.

A further specific object of the invention is to provide a strong light weight one-piece insulating cover to protect outdoor grass from desiccation and winter kill during cold winter months and which is transparent and porous for the passage of air and moisture and which maintains increased turf temperature and stimulates early root and top growth comprising at least one panel of open weave scrim material formed by loosely woven thin and narrow UV stabilized strips of clear plastic material having a non-uniform striped lace coating of highly UV stabilized plastic covering less than 50% of the surface area of the scrim with the remaining areas of the scrim permitting passage of air and moisture through the open weave of the scrim.

Another specific object of the invention is to provide a method of enhancing the germination, and growth, of seeds such as grass, flower and vegetable seeds comprising covering the seeds with a lightweight cover comprising at least one panel of open weave scrim material formed by loosely woven thin and narrow UV stabilized strips of clear transparent plastic material having a non-uniform striped lace coating of highly UV stabilized plastic covering less than 50% of the surface and of the scrim with the remaining surface area of the scrim permitting passage of air and moisture through the open weave at the scrim, and securing the cover in position.

Still a further specific object of the invention is to provide a strong, lightweight insulating cover to enhance the germination, and growth, of seeds such as grass, flower and vegetable seeds and which is transparent and porous for the passage of air and moisture, comprising at least one panel.

BRIEF DESCRIPTION OF DRAWINGS

The inventive concept will now be more fully described with reference to the accompanying drawings wherein.

DETAILED DESCRIPTION OF DRAWINGS

Figure 1:
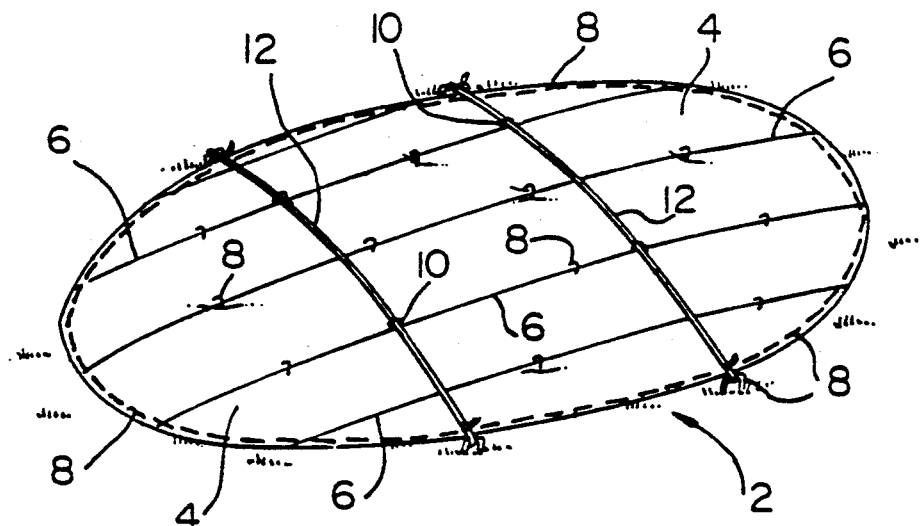
FIG. 1 is a perspective view of one form of the present cover secured in position over an area of grass which is to be protected.

The inventive concept will now be described with reference to these accompanying drawings wherein like reference numerals refer to like parts.

Figure 2:
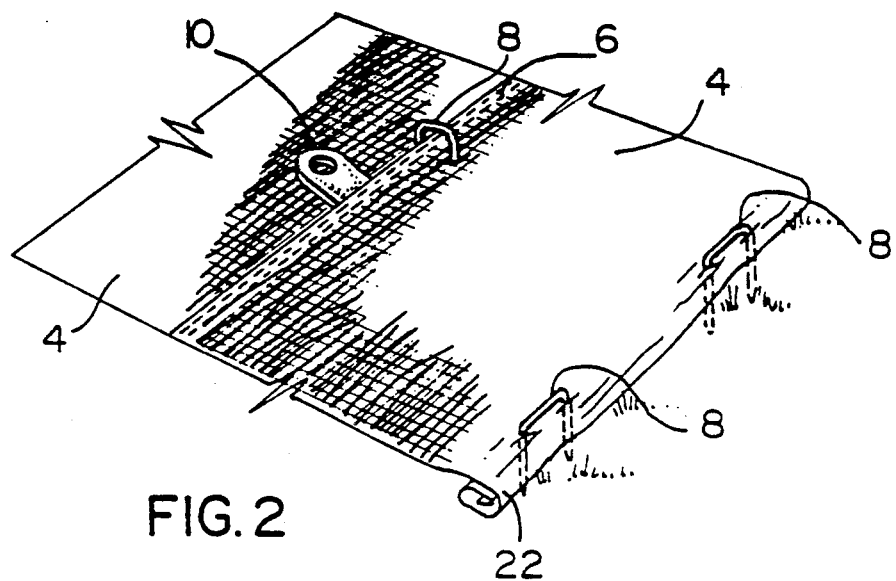
FIG. 2 is an enlarged perspective view of a portion of the cover shown in FIG. 1 and illustrating a seam joining adjacent panels and also showing a loop for receiving a hold-down rope and the positioning of wire stakes through the cover into the ground to hold the cover in position.

The cover is shown generally in FIG. 1 by numeral 2 and is shown as consisting of a number of panels 4 which are secured together along adjoining edges by stitching to form seams 6 (see also FIG. 2).

As any number of panels can be sewn together the cover can be manufactured in any desired size to cover a particular area of grass which is to be protected such as greens and tees on golf courses. As all golf course greens vary somewhat in size and shape, it is contemplated that each green have its own individually manufactured cover which is to be used year after year on the same green. Due to the light weight of the material and the fact that the material is porous, it can be folded and rolled into a compact bundle and then stored in a poly bag or similar through the summer months.

To simplify identification, individual bags can be marked with the number of the tee or green with which the cover is to be used.

In use, and in the early fall after the grass is readied for the winter months and is trimmed and/or fertilized as required, the cover is simply positioned and secured over the grass as will be described in more detail below.

Figure 4:
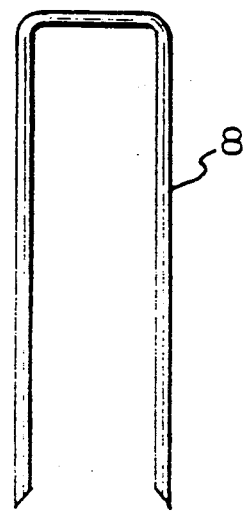
FIG. 4 is a perspective view of a wire stake suitable for securing a cover in position.

To secure the cover in position, it is usually necessary only to use wire stakes or pins 8 of the type shown in FIG. 4 which are simply pushed through the cover and into the ground. The stakes which may have a length of 6 inches or so provide ground hugging securement in all but the most windy conditions. Around the periphery of the cover, the edges are folded inwardly once or twice to provide several thicknesses of cover and the stakes are then simply pushed downwardly through the folded portion of the cover into the ground. The stakes will be positioned at distances of approximately 2–3 feet completely around the periphery of the cover.

Additionally, the central portion of the cover may be secured to the ground by positioning the stakes in straddling fashion over the seams 6 and then simply pushing the pins through the cover into the ground. It has been found that positioning the stakes a distance of approximately 10–15 feet or so apart along each of the seams is usually quite sufficient for firm securement.

In areas of high wind, the provision of additional means to hold the cover down may be found to be desirable or necessary. As shown in FIGS. 1 and 2, plastic loop members 10 may be sewn into the seams 6 at spaced distances therealong to receive ropes 12 which extend completely across the cover with the ends of the rope being anchored to the ground by the stakes as shown in FIG. 1. While the above description and accompanying drawings show the loops 10 positioned centrally of the cover and sewn in the seams, it will be appreciated that loops could also be positioned around the outer periphery of the cover and secured thereto by means such as stitching or be sewn into stitched seams extending peripherally around the cover.

Figure 3:
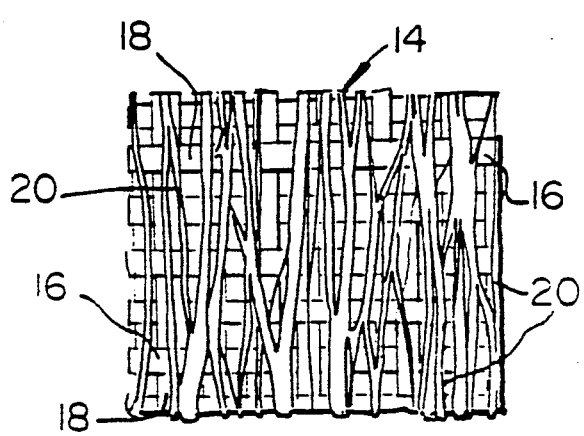
FIG. 3 is an enlarged view illustrating the coated scrim material used in the present cover.

FIG. 3 is an enlarged perspective view illustrating a portion of the fabric material which forms the individual panels. Numeral 14 designates the open weaved scrim formed by the open weaving of plastic strips 16 and 18, and numeral 20 designates the stripes of lace coating of plastic which is applied to the surface of the scrim to bond specific areas of the scrim together while leaving the remaining of the surface of the scrim in loose weave condition to permit the passage of air and moisture. As indicated earlier, the application of the plastic stripe coating 20 is to cover less than one-half of the surface area of the scrim, leaving the remaining surface area in open weave form to provide the necessary porosity.

Figure 5:
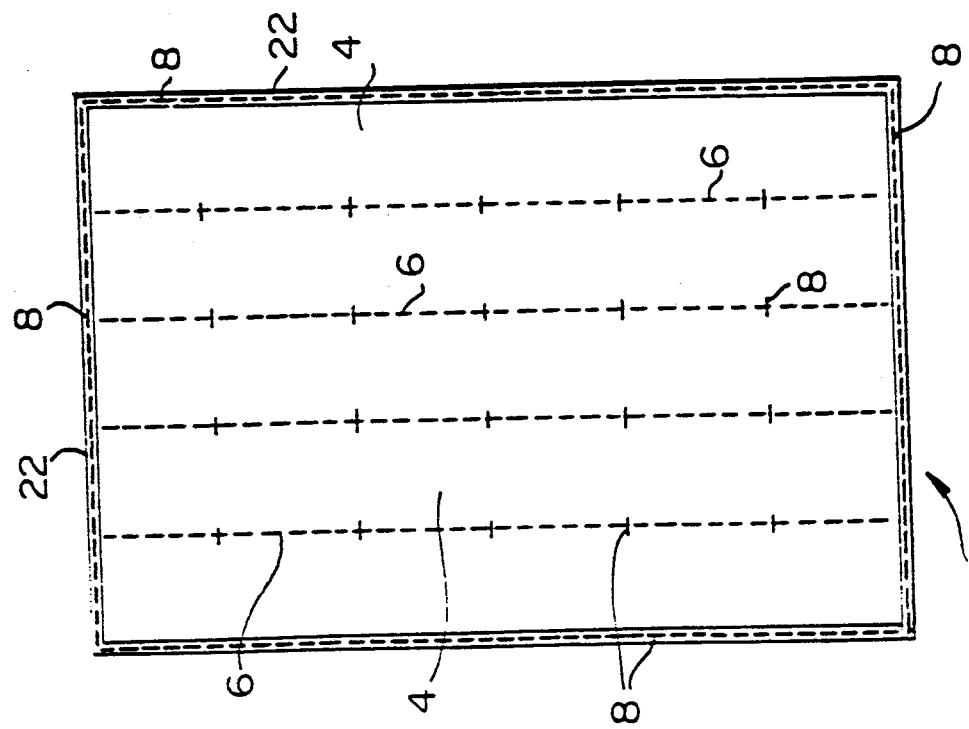
FIG. 5 is a top view of one form of a typical cover secured in position.

FIG. 5 illustrates in top view a typical cover 2 for covering a golf course green and which consists of five panels 4 secured together with each of the panels being about 90 feet long and 12 feet wide to cover an area of approximately 5400 square feet. Individual covers can of course be larger or smaller and if desired the covers can simply be trimmed by shears to fit greens of irregular size.

In securing the cover of FIG. 5 wire stakes 8 of the type shown in FIG. 4 and which have sharpened or bevelled points are positioned approximately 15 feet apart in straddling fashion (see FIG. 2) along the length of each of the seams 6, with the periphery 22 of the cover which is rolled under or folded back to provide a preferably three ply edge being secured by positioning the wire stakes 8 in the manner shown in FIG. 2 approximately 30 inches or so apart. Some of the peripherally positioned stakes 8 may also advantageously be positioned to straddle the ends of the seams 6.

Figure 6:
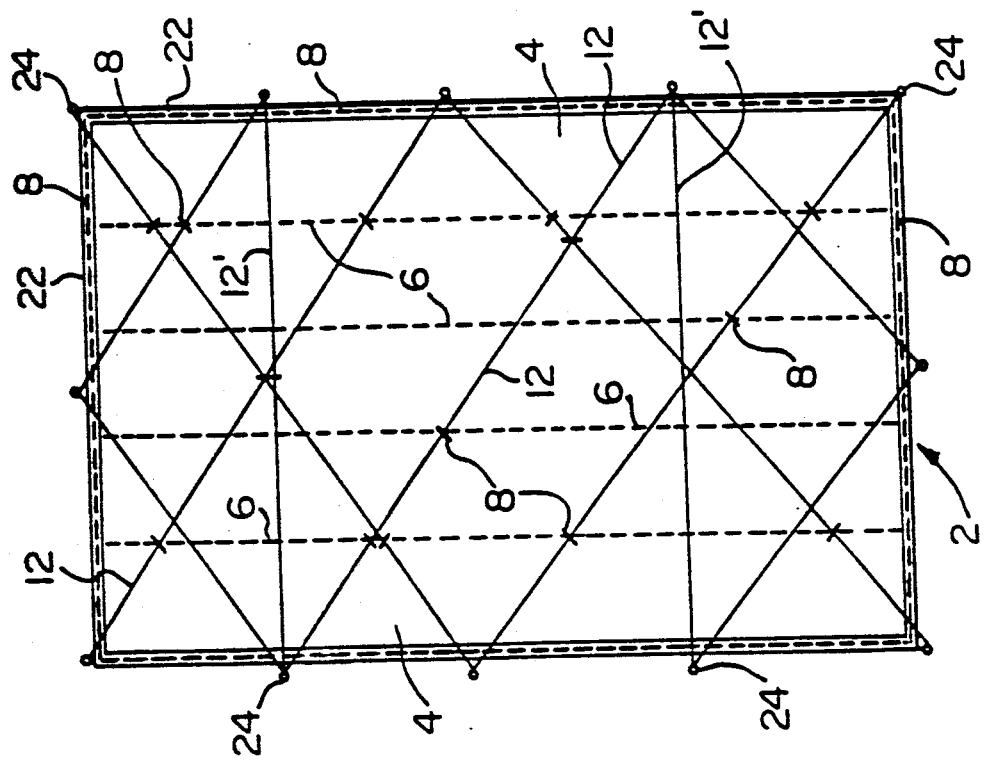
FIG. 6 is a top view of one form of a typical cover illustrating an alternative or additional method for securing the cover in position.

An alternative or additional method of securing a cover in position is shown in FIG. 6. In this method, ropes 12 are positioned diagonally and in criss-cross fashion across the cover as shown. A rope is first tied to one wooden or metal stake 24 preferably positioned at a corner and outside the cover and the rope is then simply passed back and forth over the cover and around the remaining stakes 24 as shown. Two or more ropes extending diagonally across the cover can be used and as shown ropes may also extend transversely across the cover as shown at 12'. Where the ropes cross seams 6 wire stakes 8 are positioned in straddling fashion over both the rope and seam as shown. If two of the ropes cross a seam at approximately the same place then two wire stakes will be positioned to straddle the ropes and seam. In this method, the peripheral edges of the cover are secured by the wire stakes 8 in the manner as described with reference to FIG. 5.

While FIGS. 2, 5 and 6 show the peripherally positioned wire stakes 8 as being generally parallel to the side and end edges of the cover these stakes can advantageously be positioned at a slight angle to the edges of for example 30° for more positive securement by penetrating both the warp and weft strips of the scrim material.

A further very advantageous feature of the one-piece construction of the present cover which is rot and mildew proof is that the formation of seam or join marks on the greens which often occur when individually laid panels are used to cover a large area, is completely avoided.

While the cover of this invention has as an ideal use the covering of golf greens during cold winter months to prevent winter damage and to enhance spring revitalization and growth, it will be apparent that the present cover has equal application on any grass area where winter protection and early spring revitalization is desired. Also, the cover has application to areas where seed germination is required and can be enhanced, the cover protecting the seed before and during germination.

Because of its light weight and strength, the cover can be of any desired size such as a size to cover a large golf green and grassed playing field. However, it will be appreciated that the cover can be made of much smaller size consisting possibly of only a single panel or part of a panel, for use by homeowners to protect areas of problem grass against winter damage and to promote earlier spring growth. Also, smaller covers are useful for covering smaller areas for reseeding, such as in the repair of greens and tees at golf courses, worn areas on football fields and the like.

Because of its light weight and strength, actual tests have demonstrated its ease of positioning and renewal, and this is a clear advantage during the spring months when it may be desirable on warmer days to remove the cover from the green and to replace it before nightfall in the event of expected frost. In positioning and removing the cover and due to the strength of the material, it is simply necessary to grasp an edge of the cover and pull it into desired position.

In the tests which have been conducted with this cover as discussed earlier, the time of removal from the greens was at the discretion of the individual superintendents and some covers were removed as early as the middle of March, and as late as mid-April. No negative effects were observed as a result of the covers being left on into April, while significant green up was achieved. Incidence of snow mold was minimal, in all cases being the same as or less than that of adjacent uncovered areas, and in fact where covers were left in place into April, up to 90% healing of snow mold was observed. There were no reported cases of regression of any of the greens subsequent to the removal of the cover even though in some locations a further snowfall occurred.

As a result of increased temperature beneath the cover root development was stimulated early and tests established that root growth was well in advance of normal expectations.

The higher temperature beneath the cover also resulted in frost leaving the ground earlier permitting maintenance staff to work on the greens much sooner.

Not only has the present cover proved its effectiveness during cold snowy months, it has also been found that it is equally effective in re-establishing greens which were left unprotected during the winter months and damaged by desiccation. Severely damaged unprotected greens were covered during March and April for a period of 10 to 14 days and the results were dramatic with greatly improved growth and much new growth in desiccated areas.

On golf courses, parts of a green, or tee, can be repaired, by reseeding, while the rest of the green, or tee, is still in use. Covers, in accordance with the invention, are also useful where major repair, or other work, is carried out, for example, on fairways. If it is necessary to close any particular part of a course for major repair and the like, the time out of use will be substantially reduced.

For the domestic user, small panels or covers are useful for the repair, as by reseeding, at areas of lawns, killed as by winds, salt, or pets. Covers in accordance with the invention can also be used over other growing areas. For example, covers can be positioned over seed flats for enhancement of germination. Covers can also be placed over areas where seeds have been sown directly in the ground. Covers can be used inside greenhouses to enhance germination. Covers can be held down by wire stakes as in FIG. 4.

Use of covers also reduces the amount of watering required. This saves water and can also prevent damage to the ground which can occur during watering. Once thoroughly watered, a cover will retain moisture in the ground. The covers protect the seeds and a higher percentage of seeds shown remain and germinate.

I claim:

1. A method of improving surface soil conditions and enhancing growth, comprising covering the surface of the soil with a reusable lightweight insulating cover comprising at least one panel of open weave scrim material formed by loosely woven thin and narrow UV stabilized strips of clear transparent plastic material having a non-uniform striped lace coating of highly UV stabilized plastic covering less than 50% of the surface area of the scrim with the remaining surface area of the scrim permitting passage of air and moisture through the open weave of the scrim.

2. The method of claim 1, wherein the plastic lace coating covers approximately 30% of the surface area of the scrim.

3. The method of claim 1, wherein the cover is secured over the surface by passing stakes of inverted U-shape through the cover, at least around the peripheral edges thereof, and into the ground.

4. The method of claim 3, including passing said stakes through the cover at spaced locations thereover.

5. The method of claim 1, wherein the cover comprises a plurality of panels secured together by stitched seams.

6. The method of claim 5, including the step of positioning ropes over the cover and through loops provided at spaced distances along the cover and securing ends of the ropes to the ground to hold the cover in place.

7. The method of claim 1, wherein the plastic material forming the strips of the open weave scrim is polyethylene and the striped lace coating is of polyethylene compatible with the polyethylene of the strips.

8. The method of claim 1, wherein the plastic material forming the strips of the open weave scrim is polypropylene and the striped lace coating is of polypropylene compatible with the polypropylene of the strips.

9. A method of enhancing the growth of grass, comprising covering the grass with a reusable lightweight insulating cover comprising at least one panel of open weave scrim material formed by loosely woven thin and narrow UV stabilized strips of clear transparent plastic material having a non-uniform striped lace coating of highly UV stabilized plastic covering less than 50% of the surface area of the scrim with the remaining surface area of the scrim permitting passage of air and moisture through the open weave of the scrim.

10. The method of claim 9, wherein the plastic lace coating covers approximately 30% of the surface area of the scrim.

11. The method of claim 9, wherein the cover is secured over the surface by passing stakes of inverted U-shape through the cover, at least around the peripheral edges thereof, and into the ground.

12. The method of claim 11, including passing said stakes through the cover at spaced locations thereover.

13. The method of claim 9, wherein the cover comprises a plurality of panels secured together by stitched seams.

14. The method of claim 13, including the step of positioning ropes over the cover and through loops provided at spaced distances along the cover and securing ends of the ropes to the ground to hold the cover in place.

15. The method of claim 9, wherein the plastic material forming the strips of the open weave scrim is polyethylene and the striped lace coating is of polyethylene compatible with the polyethylene of the strips.

16. The method of claim 9, wherein the plastic material forming the strips of the open weave scrim is polypropylene and the striped lace coating is of polypropylene compatible with the polypropylene of the strips.

17. A method of protecting an area of outdoor grass from desiccation and kill during winter months and for increasing turf temperature and stimulating early root and top growth, comprising directly covering the area of grass in the fall with a reusable lightweight insulating one-piece cover comprising at least one panel of open weave scrim material formed by loosely woven thin and narrow UV stabilized strips of clear transparent plastic material having a non-uniform striped lace coating of highly UV stabilized plastic covering less than 50% of the surface area of the scrim with the remaining surface area of the scrim permitting passage of air and moisture through the open weave of the scrim, securing the cover in position in direct contact with the grass, maintaining the cover in contact with the grass during the winter months and, removing the cover in the spring.

18. Method according to claim 17, wherein the plastic lace coating covers approximately 30% of the surface area of the scrim.

19. Method according to claim 17, wherein the cover is secured over the grass by passing wire stakes of inverted U-shape through the cover at spaced locations thereover and around peripheral edges thereof and into the ground.

20. Method according to claim 17, wherein the cover comprises a plurality of panels secured together by stitched seams.

21. Method according to claim 20, wherein the cover is manufactured to cover an area of specific size such as a golf course green.

22. Method according to claim 20, including the step of positioning ropes over the cover and through loops provided at spaced distances along the seams and securing ends of the ropes to the ground to hold the cover in position over the grass.

23. Method according to claim 17, wherein the plastic material forming the strips of the open weave scrim is polyethylene and the striped lace coating is of polyethylene compatible with the polyethylene of the strips.

24. Method according to claim 17, wherein the plastic material forming the strips of the open weave scrim is polypropylene and the striped lace coating is of polypropylene compatible with the polypropyelene of the strips.

25. Method according to claim 20, wherein the cover is secured over the grass by passing wire stakes of inverted U-shape through the cover around peripheral edges thereof, and by positioning similar wire stakes in straddling fashion over the seams joining adjacent panels at spaced distances therealong and pushing the stakes into the ground.

26. Method according to claim 20, wherein the cover is secured over the grass by passing wire stakes of inverted U-shape through the cover around peripheral edges thereof and into the ground, and by passing ropes in transverse or in diagonal criss-cross direction over the cover and securing the ropes to stakes positioned in the ground outside the cover.

27. Method according to claim 26 including the further step of positioning wire stakes in straddling fashion over the ropes and seams where they cross and pushing the stakes through the cover and into the ground.

28. A method of enhancing the growth of seeds, comprising covering the seeds with a reusable lightweight insulating cover comprising at least one panel of open weave scrim material formed by loosely woven thin and narrow UV stabilized strips of clear transparent plastic material having a non-uniform striped lace coating of highly UV stabilized plastic covering less than 50% of the surface area of the scrim with the remaining surface area of the scrim permitting passage of air and moisture through the open weave of the scrim.

29. The method of claim 28, wherein the plastic lace coating covers approximately 30% of the surface area of the scrim.

30. The method of claim 28, wherein the cover is secured over the surface by passing stakes of inverted U-shape through the cover, at least around the peripheral edges thereof, and into the ground.

31. The method of claim 30, including passing said stakes through the cover at spaced locations thereover.

32. The method of claim 28, wherein the cover comprises a plurality of panels secured together by stitched seams.

33. The method of claim 32, including the step of positioning ropes over the cover and through loops provided at spaced distances along the seams and securing ends of the ropes to the ground to hold the cover in place.

34. The method of claim 28, wherein the plastic material forming the strips of the open weave scrim is polyethylene and the striped lace coating is of polyethylene compatible with the polyethylene of the strips.

35. The method of claim 28, wherein the plastic material forming the strips of the open weave scrim is polypropylene and the striped lace coating is of polypropylene compatible with the polypropylene of the strips.

* * * * *